United States Patent [19]
Nichols, Jr.

[11] Patent Number: 5,239,848
[45] Date of Patent: Aug. 31, 1993

[54] TRUCK GLADHAND LOCK APPARATUS

[76] Inventor: Edmund V. Nichols, Jr., #N7517 E.G. White Ct., Portage, Wis. 53901

[21] Appl. No.: 993,366

[22] Filed: Dec. 18, 1992

[51] Int. Cl.$^5$ .................. E05B 65/12; F16L 35/00
[52] U.S. Cl. ........................................ 70/14; 70/57; 70/258; 70/432; 285/80
[58] Field of Search ............... 70/14, 57, 237, 258, 70/432, 441, DIG. 48; 285/73, 76, 79, 80

[56] References Cited

U.S. PATENT DOCUMENTS

| | | | |
|---|---|---|---|
| 415,062 | 11/1889 | Pritchard | 285/73 X |
| 674,582 | 5/1901 | Lewy | 70/441 |
| 1,250,325 | 12/1917 | Krueger | 285/79 X |
| 1,820,535 | 8/1931 | Gold et al. | 285/79 X |
| 2,171,288 | 8/1939 | Dearborn | 285/79 X |
| 3,892,431 | 7/1975 | Booth | 285/79 |
| 4,226,103 | 10/1980 | Strickland | 70/14 X |
| 4,366,965 | 1/1983 | Rhodes | 248/75 X |
| 5,129,243 | 7/1992 | Kassebaum | 70/57 X |

Primary Examiner—Lloyd A. Gall
Attorney, Agent, or Firm—Leon Gilden

[57] ABSTRACT

A gladhand structure arranged for pneumatic communication between first and second conduits includes confronting and interlocking housings, with the housings including projecting flanges extending in a parallel relationship relative to one another, with the flanges arranged to receive a U-shaped locking rod structure to secure the housings together preventing their disassembly and misalignment.

3 Claims, 4 Drawing Sheets

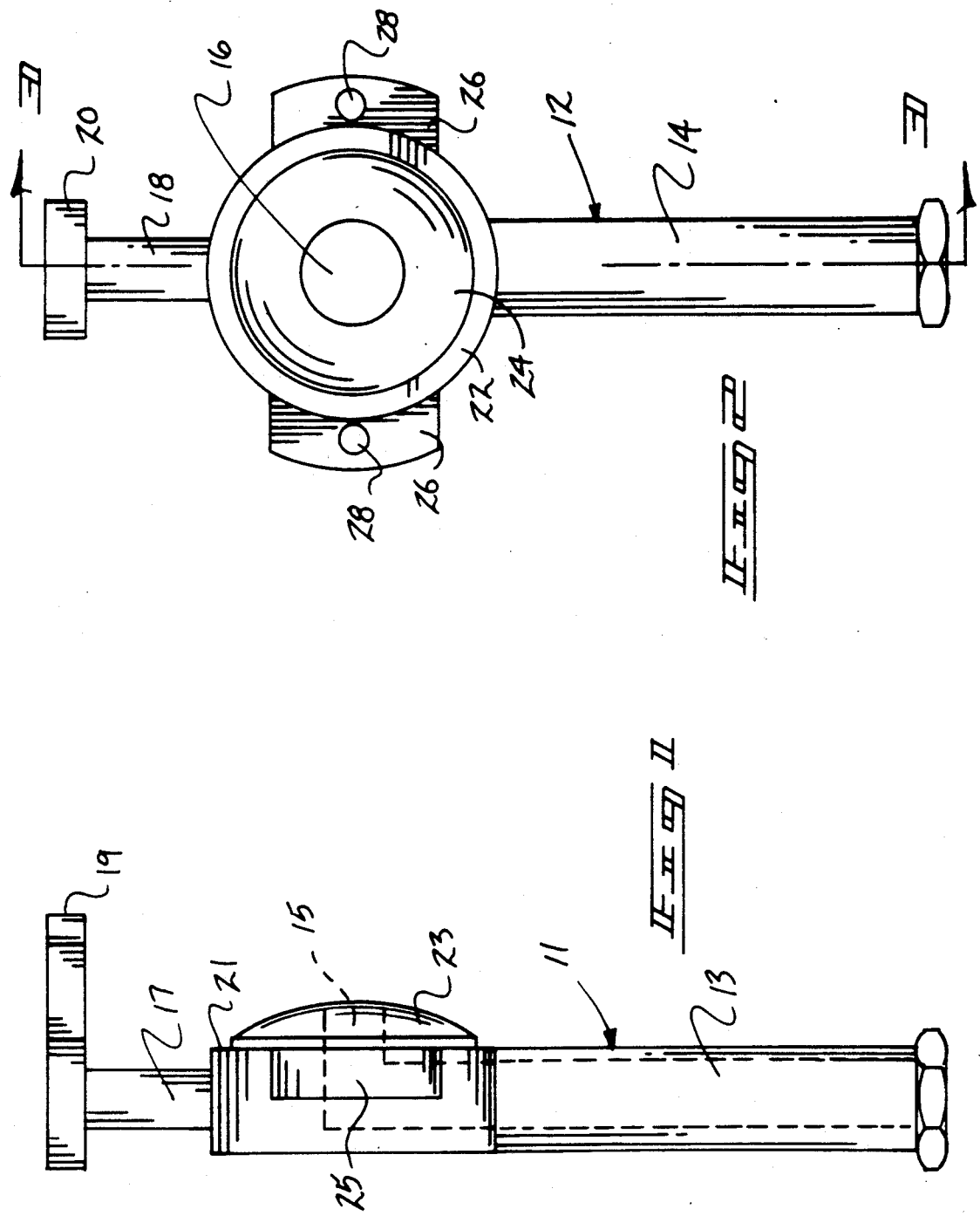

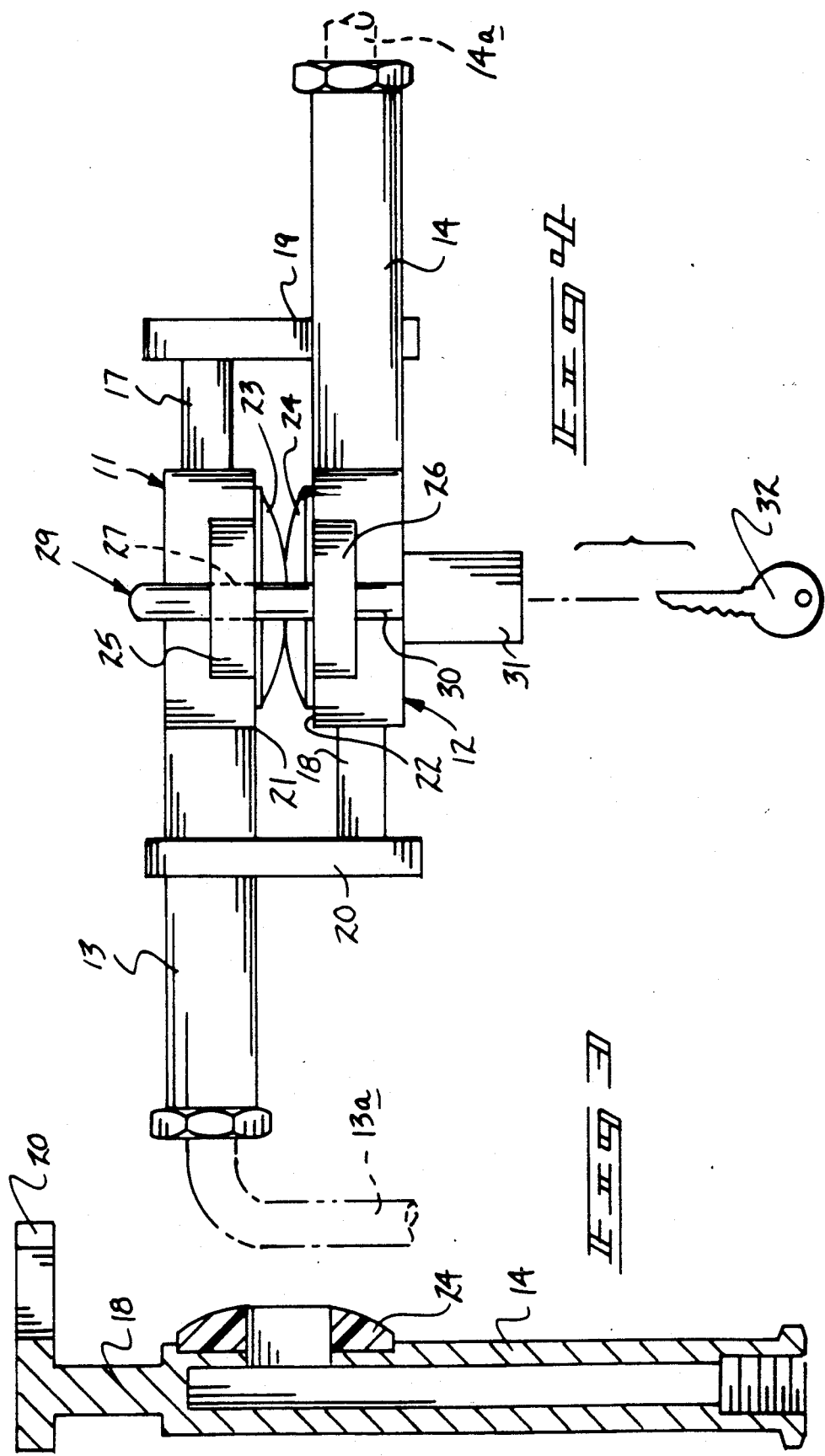

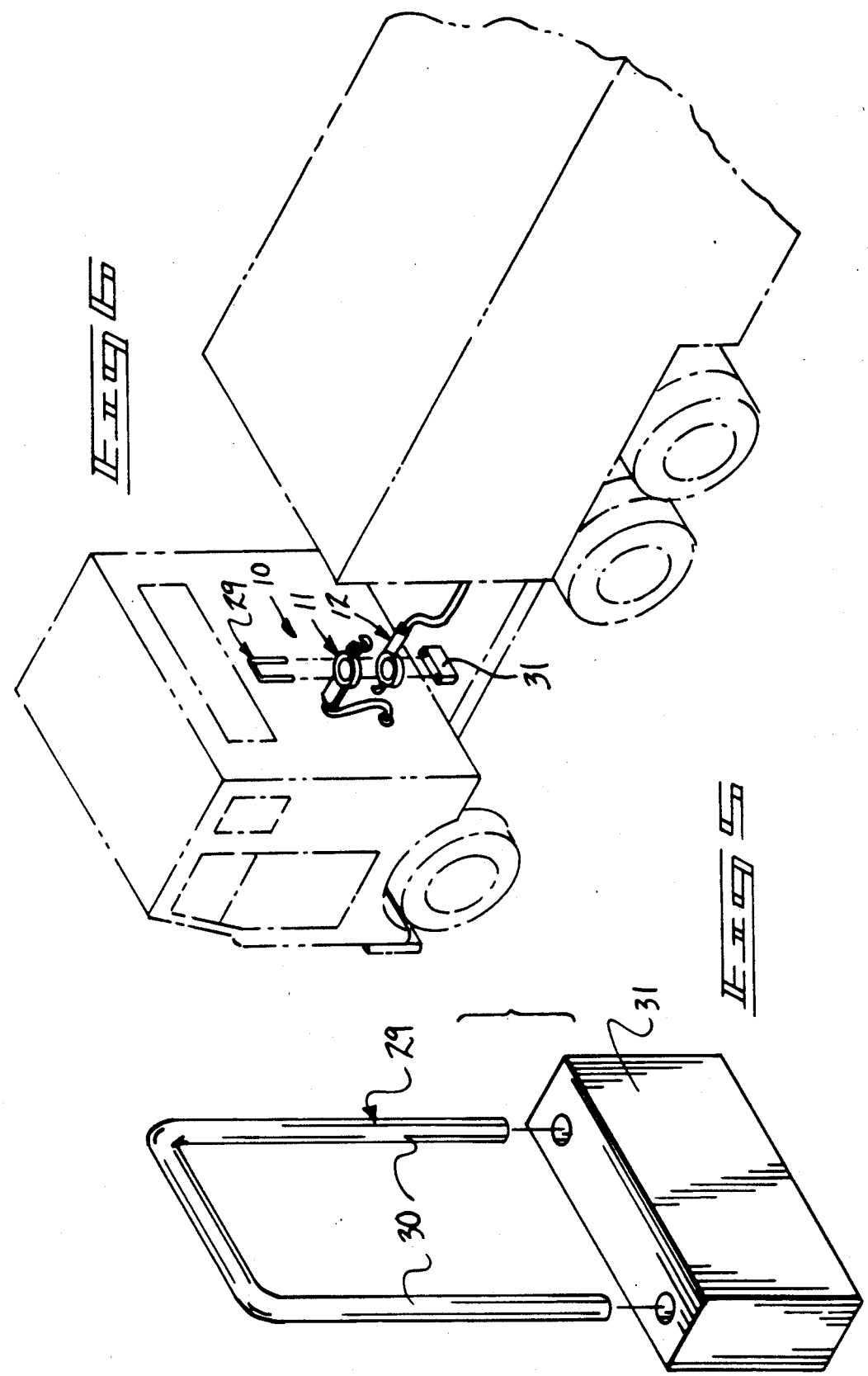

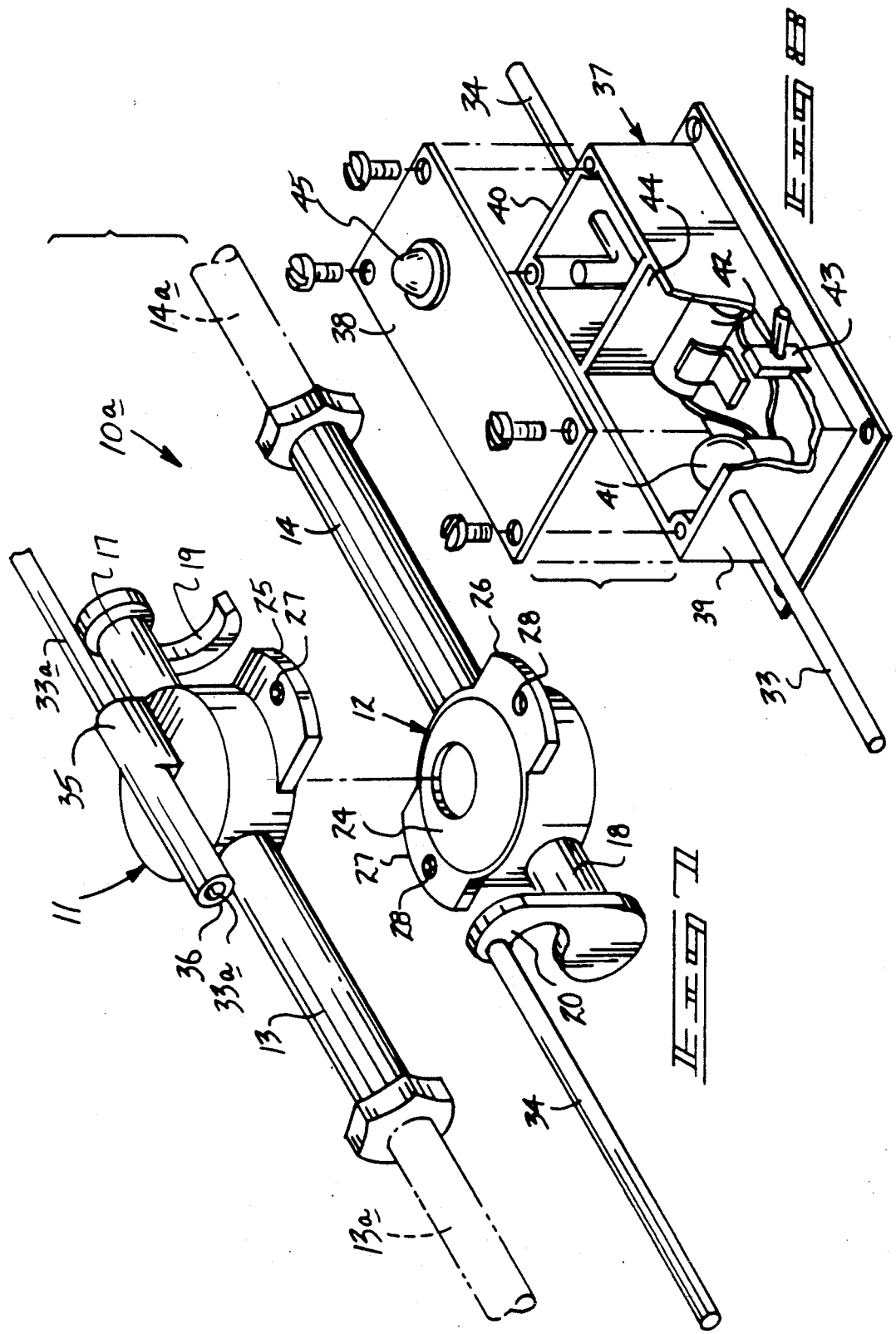

TRUCK GLADHAND LOCK APPARATUS

BACKGROUND OF THE INVENTION

1. Field of the Invention

The field of invention relates to gladhand structure, and more particularly pertains to a new and improved truck gladhand lock apparatus wherein the same is arranged to provide for rapid intercommunication of latching and subsequent delatching of conduit structures relative to one another.

2. Description of the Prior Art

Gladhand structure of various types have been utilized throughout the prior art and such exemplified in U.S. Pat. No. 4,366,965. The use of such gladhand structure permits the rapid, pneumatic communication of air brakes and the like from a truck trailer relative to a truck cab. The instant invention attempts to overcome deficiencies of the prior art by providing for a latching structure to insure maintaining alignment of cooperating housings relative to one another and in this respect, the present invention substantially fulfills this need.

SUMMARY OF THE INVENTION

In view of the foregoing disadvantages inherent in the known types of truck locking gladhand apparatus now present in the prior art, the present invention provides a truck gladhand lock apparatus wherein the same is arranged to employ a U-shaped lock rod arranged to secure cooperating housings of the gladhand structure together. As such, the general purpose of the present invention, which will be described subsequently in greater detail, is to provide a new and improved truck gladhand lock apparatus which has all the advantages of the prior art truck gladhand lock apparatus and none of the disadvantages.

To attain this, the present invention provides a gladhand structure arranged for pneumatic communication between first and second conduits including confronting and interlocking housings, with the housings including projecting flanges extending in a parallel relationship relative to one another, with the flanges arranged to receive a U-shaped locking rod structure to secure the housings together preventing their disassembly and misalignment.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck gladhand lock apparatus which has all the advantages of the prior art truck gladhand lock apparatus and none of the disadvantages.

It is another object of the present invention to provide a new and improved truck gladhand lock apparatus which may be easily and efficiently manufactured and marketed.

It is a further object of the present invention to provide a new and improved truck gladhand lock apparatus which is of a durable and reliable construction.

An even further object of the present invention is to provide a new and improved truck gladhand lock apparatus which is susceptible of a low cost of manufacture with regard to both materials and labor, and which accordingly is then susceptible of low prices of sale to the consuming public, thereby making such truck gladhand lock apparatus economically available to the buying public.

Still yet another object of the present invention is to provide a new and improved truck gladhand lock apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a first housing structure.

FIG. 2 is an orthographic top view of a second housing structure.

FIG. 3 is an orthographic view, taken along the lines 3—3 of FIG. 2 in the direction indicated by the arrows.

FIG. 4 is an orthographic side view of the first and second housings arranged for interlocking relative to one another.

FIG. 5 is an isometric illustration of the lock structure of the invention.

FIG. 6 is an isometric illustration of the invention arranged relative to a truck tractor and trailer arrangement.

FIG. 7 is an isometric illustration of a modified apparatus as indicated by the invention.

FIG. 8 is an isometric illustration of the indicator housing as employed by the apparatus as set forth in FIG. 7.

DESCRIPTION OF THE PREFERRED EMBODIMENT

With reference now to the drawings, and in particular to FIGS. 1 to 8 thereof, a new and improved truck gladhand lock apparatus embodying the principles and concepts of the present invention and generally designated by the reference numerals 10 and 10a will be described.

More specifically, the truck gladhand lock apparatus 10 of the instant invention includes a first lock housing 11 arranged for registration with a second lock housing 12, each of a mirror image configuration, having a first housing rigid conduit 13 directed into the first lock housing 11, with a second housing rigid conduit 14 directed into the second lock housing 12. The first and second conduits 13 and 14 are arranged for communication with respective first and second fluid (or pneumatic) hoses 13a and 14a respectively. A first housing port 15 orthogonally oriented relative to the first conduit 13 is directed medially of the first housing and orthogonally oriented relative to the first conduit 13. A second housing port 16 directed medially of the second housing is orthogonally oriented relative to the second conduit 14. The first and second housing ports 15 and 16 are arranged for coaxial alignment relative to one another for engagement relative to one another to permit fluid (e.g. pneumatic) communication between the first and second fluid (pneumatic) hoses 13a and 14a. A first rigid housing support rod 17 coaxially aligned with the first conduit 13 is fixedly mounted to the first housing, with a second rigid housing support rod 18 fixedly mounted to the second housing coaxially aligned with the second conduit 14. A first hook member 19 is fixedly and orthogonally mounted to the first support rod 17, with a second hook member 20 fixedly and orthogonally mounted to the second support rod 18. The first hook member 19 is arranged to receive the second conduit 14, while the second hook member 20 is arranged to recieve the first conduit 13, in a manner as indicated in FIG. 4. Further, the first and second housings include respective first and second housing top walls 21 and 22 mounting respective first and second semi-spherical resilient seals 23 and 24, having the respective first and second housing ports 15 and 16 directed therethrough. In this manner, when the first and second seals 23 and 24 are arranged for abutment engagement relative to one another as indicated in FIG. 4, the first and second ports 15 and 16 thereby coaxially aligned are arranged for sealed communication relative to one another.

The first housing includes first housing flange plates 25 mounted to opposed sides of the first housing diametrically aligned relative to the first seal 23 and coplanar with the first housing top wall 21. The second housing flange plates 26 coplanar with the second housing top wall 22 project on opposed sides of the second seal 24. The first flange 25 include first plate bores 27 directed therethrough, with the second housing flange plates 26 including second plate bores 28 directed therethrough. In this manner, when the first and second housings are in locked communication with one another, one of the first plate bores 27 is aligned with one of the second plate bores 28, wherein a U-shaped lock rod 29 having lock rod legs 30 in a parallel relationship relative to one another are directed through respective pairs of first and second plate bores 27 and 28, with free distal ends of the lock rod 29 arranged for reception and engagement within a lock housing 31 operative by a conventional key structure 32 to secure the U-shaped lock rod 29 within the lock housing 31.

The modified invention 10a, as indicated in the FIGS. 7 and 8, includes for indicator structure to provide for proper registration and alignment of the first and second housings relative to one another, particularly during periods of limited available light. To this end, a first fiber optic cable 33 mounted within an opaque cable housing 35 is secured to a bottom wall of the first housing 11 and projects beyond the first housing 11, as indicated. A second fiber optic cable 34 is mounted to the hook member 20. The first fiber optic cable has a first fiber optic cable first end 33a in alignment with the opaque cable housing outlet port 36. The outlet port 36 is arranged for abutment with the second hook member 20 and in coaxial alignment with the second fiber optic cable 34, and the first and second housings are secured relative to one another. In this manner, the first and second fiber optic cables 33 and 34 are arranged for contiguous communication relative to one another when the first and second housings are secured relative to one another, in a manner as indicated in FIG. 4. An illumination housing 37 is provided, having a housing top wall 38, with housing first and second side walls 39 and 40. A partition wall 44 is mounted within the housing defining discrete first and second chambers, with an illumination bulb 41 mounted within the first chamber in adjacency to a second end of the first cable 33 to direct illumination therethrough. When illumination is completed from the first cable to the second cable by abutment of the first cable first end 33a with the second cable first end, illumination is thereby communicated to the second cable that in turn is directed into the housing into the housing second wall 40, with the second cable second end directed into an indicator lens 45 that is mounted to the housing top wall to provide for visual indication of proper alignment of the first and second housings relative to one another. A battery 42, as well as an on/off switch 43 mounted within the first chamber, provides for selective illumination of the illumination bulb 41, wherein the second chamber isolated from the first chamber receives the second cable second end for projection into the indicator lens 45.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck gladhand lock apparatus, comprising, a first lock housing and a second lock housing, the first lock housing having a first housing top wall and a first housing bottom wall, the second housing having a second housing top wall and a second housing bottom wall, the first housing including a first housing side wall, the second housing including a second housing side wall, and a first housing rigid conduit directed into the first housing side wall, a second housing rigid conduit directed into the second housing side wall, and a first housing port orthogonally oriented relative to the first housing conduit is directed through the first housing top wall, and a second housing port directed to the second housing is orthogonally oriented to and in pneumatic communication with the second housing conduit, and the first housing top wall includes a first semi-spherical resilient seal mounted to the first housing top wall, with a first housing port directed medially of the seal extending therethrough, and a second semi-spherical resilient seal mounted to the second housing top wall, with the second housing port directed medially of and through-extending the second seal, with the first seal and the second seal arranged for abutment relative to one another aligning the first port with the second port to direct pneumatic communication between the first conduit and the second conduit, and a first support rod mounted to the first housing side wall, a second support rod mounted to the second housing side wall, the first support rod coaxially aligned with the first conduit, the second support rod coaxially aligned with the second conduit, a first hook member mounted to the first support rod, a second hook member mounted to the second support rod, wherein the first hook member is arranged for receiving the second conduit, and the second hook member is arranged for receiving the first conduit, and lock means arranged for securing the first housing to the second housing.

2. An apparatus as set forth in claim 1 wherein the lock means includes a plurality of first flange plates fixedly mounted to the first housing coplanar with the first housing top wall, and second housing flange plates fixedly mounted to the second housing coplanar with the second housing top wall, with the first flange plates each including a first bore directed therethrough, the second flange plates each including a second bore directed therethrough, wherein one of said first bores is coaxially aligned with one of said second bores when the first housing and the second housing are arranged for contiguous communication relative to one another, with the first conduit received within the second hook member, and the second conduit received within the first hook member, and a U-shaped lock rod, the U-shaped lock rod including a plurality of rod legs, with one of said rod legs received through first plate bore and said second plate bore of one of said first flange plates and one of said second flange plates, and the rod legs received within a lock rod housing to secure the first housing to the second housing.

3. An apparatus as set forth in claim 2 including a first fiber optic cable having a first cable first end and a first cable second end, and a second fiber optic cable having a second cable first end and a second cable second end, and a rigid opaque cable housing mounted to the first housing bottom wall, with the first fiber optic cable directed therein, with the opaque cable housing including an outlet port, and the first cable first end positioned in communication with the outlet port, and the second cable mounted to the second hook member, with the second cable first end directed through the second hook member, with the second cable first end and the first cable first end arranged for coaxially aligned communication relative to one another when the first housing is secured to the second housing and the first conduit is received within the second hook member and the second conduit is received within the first hook member, and an indicator housing having an indicator housing top wall, indicator housing first side wall, and an indicator housing second side wall, the first fiber optic cable second end directed into the indicator housing first side wall, and the second cable second end directed into the indicator housing second side wall, and a partition wall contained within the indicator housing dividing the indicator housing into a first chamber and a second chamber, the first chamber having an illumination bulb, and the first cable second end positioned in adjacency to the illumination bulb to direct illumination through the first fiber optic cable upon illumination of the illumination bulb, the second chamber receiving the second cable second end, with the housing top wall including an indicator lens, with the second cable second end directed into the second chamber and received within the indicator lens to effect illumination within the indicator lens upon alignment of the first cable first end with the second cable first end.

* * * * *